US011190974B2

United States Patent
Kim et al.

(10) Patent No.: US 11,190,974 B2
(45) Date of Patent: Nov. 30, 2021

(54) DEVICE AND METHOD FOR CONTROLLING NETWORK CONGESTION WITH RRC INACTIVE

(71) Applicant: Samsung Electronics Co., Ltd., Suwon-si (KR)

(72) Inventors: Sunghoon Kim, Seoul (KR); Jungje Son, Yongin-si (KR); Hoyeon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/639,510

(22) PCT Filed: Aug. 13, 2018

(86) PCT No.: PCT/KR2018/009251
§ 371 (c)(1),
(2) Date: Feb. 14, 2020

(87) PCT Pub. No.: WO2019/035616
PCT Pub. Date: Feb. 21, 2019

(65) Prior Publication Data
US 2021/0029581 A1 Jan. 28, 2021

(30) Foreign Application Priority Data
Aug. 14, 2017 (KR) .................. 10-2017-0102877

(51) Int. Cl.
*H04W 4/00* (2018.01)
*H04W 28/02* (2009.01)
(Continued)

(52) U.S. Cl.
CPC ......... *H04W 28/0289* (2013.01); *H04W 8/08* (2013.01); *H04W 48/16* (2013.01);
(Continued)

(58) Field of Classification Search
CPC . H04W 88/08; H04W 28/04; H04W 28/0289; H04W 76/18; H04W 76/19;
(Continued)

(56) References Cited

U.S. PATENT DOCUMENTS

2009/0124212 A1  5/2009  Islam et al.
2013/0039244 A1  2/2013  Sun
(Continued)

FOREIGN PATENT DOCUMENTS

KR  10-2010-0086040 A  7/2010
KR  10-2014-0033230 A  3/2014
(Continued)

OTHER PUBLICATIONS

ISA/KR, International Search Report and Written Opinion of the International Searching Authority, International Application No. PCT/KR2018/009251, dated Nov. 12, 2018, 26 pages.
(Continued)

*Primary Examiner* — Temica M Beamer (57) ABSTRACT

The present invention relates to a communication technique for converging IoT technology with 5G communication systems for supporting higher data transmission rates than 4G systems and to a system therefor. The present disclosure can be applied to intelligent services (e.g., smart home, smart building, smart city, smart car or connected car, health care, digital education, retail business, security- and safety-related services, etc.) on the basis of 5G communication technology and IoT-related technology. The present invention proposes two methods, a method for resolving the congestion situation of a CN while keeping a terminal RRC-inactive and a method for resolving the congestion situation of a CN by switching a terminal to RRC-idle.

20 Claims, 4 Drawing Sheets

(51) Int. Cl.
*H04W 76/19* (2018.01)
*H04W 76/18* (2018.01)
*H04W 76/30* (2018.01)
*H04W 76/27* (2018.01)
*H04W 8/08* (2009.01)
*H04W 48/16* (2009.01)

(52) U.S. Cl.
CPC ........... *H04W 76/18* (2018.02); *H04W 76/19* (2018.02); *H04W 76/27* (2018.02); *H04W 76/30* (2018.02)

(58) Field of Classification Search
CPC ....... H04W 76/27; H04W 76/30; H04W 8/08; H04W 48/16; H04W 72/04; H04W 72/042; H04L 5/0007
USPC .......................................... 370/329; 455/453
See application file for complete search history.

(56) References Cited

U.S. PATENT DOCUMENTS

| | | | |
|---|---|---|---|
| 2013/0039287 A1 | 2/2013 | Rayavarapu et al. | |
| 2013/0051325 A1 | 2/2013 | Ryu et al. | |
| 2015/0181525 A1 | 6/2015 | Gupta et al. | |
| 2018/0199251 A1 | 7/2018 | Kim et al. | |
| 2019/0342821 A1* | 11/2019 | Kim | H04W 76/18 |
| 2019/0350035 A1* | 11/2019 | Kim | H04W 48/02 |
| 2020/0178158 A1* | 6/2020 | Won | H04W 48/18 |
| 2020/0221529 A1* | 7/2020 | Park | H04W 8/08 |
| 2021/0007171 A1* | 1/2021 | Jeon | H04W 74/006 |

FOREIGN PATENT DOCUMENTS

| | | |
|---|---|---|
| KR | 10-2014-0043138 A | 4/2014 |
| KR | 10-2014-0050724 A | 4/2014 |
| KR | 10-2018-0079895 A | 7/2018 |

OTHER PUBLICATIONS

KDDI, "23.501: Introducing congestion and overload control for AMF and SMF", 3GPP TSG SA WG2 Meeting #118bis, Jan. 16-20, 2017, S2-170299, 2 pages.

Intel Corporation, "Email discussion report on [98#30][NR] RRC Connection Control", 3GPP TSG RAN WG2 Meeting Ad-Hoc, Jun. 27-29, 2017, R2-1707038, 58 pages.

Supplementary European Search Report dated Jun. 29, 2020 in connection with European Patent Application No. 18 84 6954, 7 pages.

\* cited by examiner

DEVICE AND METHOD FOR CONTROLLING NETWORK CONGESTION WITH RRC INACTIVE

CROSS-REFERENCE TO RELATED APPLICATIONS

This application is a 371 National Stage of International Application No. PCT/KR2018/009251, filed Aug. 13, 2018, which claims priority to Korean Patent Application No. 10-2017-0102877, filed Aug. 14, 2017, the disclosures of which are herein incorporated by reference in their entireties.

BACKGROUND

1. Field

Detailed description of embodiments of the disclosure will be made mainly based on a radio access network in which 5G network standard is defined by 3rd generation partnership project (3GPP), a new RAN (NR) which is a core network, and a packet core (a 5G system, a 5G core network, or a next generation core (NG core)). However, the subject matter of the disclosure may be applied to other communication systems having similar technical backgrounds through slight modification without largely departing from the scope of the disclosure, and this may be determined by a person skilled in the art.

The disclosure will be described for a radio access network in which LTE standard is defined by the 3GPP, eNB which is a core network, and an MME.

Hereinafter, for the convenience of description, some terms and names defined in the 3GPP long-term evolution standard may be used. However, the disclosure is not limited by the terms and names, and may also be applied to systems conforming to other standards in the same manner.

2. Description of Related Art

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in an mmWave band (for example, 60 GHz band) is being considered. In the 5G communication system, technologies such as beamforming, massive MIMO, full dimensional MIMO (FD-MIMO), array antenna, analog beam-forming, and large scale antenna techniques are being discussed as means to mitigate a propagation path loss in the mm Wave band and increase a propagation transmission distance. Further, the 5G communication system has developed technologies such as an evolved small cell, an advanced small cell, a cloud radio access network (RAN), an ultra-dense network, Device to Device communication (D2D), a wireless backhaul, a moving network, cooperative communication, coordinated multi-points (CoMP), and received interference cancellation in order to improve the system network. In addition, the 5G system has developed advanced coding modulation (ACM) schemes such as hybrid FSK and QAM Modulation (FQAM) and sliding window superposition coding (SWSC), and advanced access technologies such as filter bank multi carrier (FBMC), non-orthogonal multiple access (NOMA), and sparse code multiple access (SCMA).

Meanwhile, the Internet has evolved from a human-oriented connection network in which humans generate and consume information to the Internet of Things (IoT), in which distributed components such as objects exchange and process information. Internet of Everything (IoE) technology, in which a big data processing technology is combined with the IoT technology through a connection via a cloud server or the like, has emerged. In order to implement the IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create new value in peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply 5G communication to the IoT network are being made. For example, 5G communication technology, such as a sensor network, machine-to-machine (M2M) communication, and machine-type communication (MTC), has been implemented through techniques, such as beamforming, MIMO, and array antennas. The application of a cloud RAN as big data processing technology is an example of convergence of 5G technology and the IoT technology.

SUMMARY

In LTE, a new connection mode, which is referred to as a light connection, has been introduced, in which an RRC state of a terminal is in an inactive state, but the terminal is in a state of being connected to a core network. In 5G, the light connection is applied, and is referred to as an RRC-inactive state.

A conventional terminal exists only in an RRC connected or RRC idle state, and a lot of signaling is inevitable in order to switch from the RRC idle state to the RRC-connected state. Accordingly, as a method for optimizing the signaling, there is technology in which the RRC-inactive state or the light connection mode is defined and a terminal is able to establish an RRC connection using only a very small amount of signaling to perform data communication.

In the light connection mode or the RRC-active mode (or state), the terminal is considered to be in the connected state from the standpoint of a core network, and both a user plane and a control plane for the terminal in the core network are maintained in an active state. If data for the terminal is generated, the corresponding data is transmitted to the base station through a gateway, and the base station may find the terminal through RAN level paging and change the state of the terminal to the RRC-connected state in order to transmit the data.

According to the technology described above, in the case where a core network, that is, more particularly, AMF of a 5G system or MME of a 4G system, is congested, the AMF or MME transmits an overload control message to a base station in order to perform congestion control, which may affect operation of the base station. That is, from the standpoint of the core network, the terminal is in the connected state but the terminal is in an inactive state on the RRC, and the RRC processing according to the congestion of the core network is performed for the terminal which is in the RRC-idle state, whereas the base station has not defined a method for processing the terminal which is in the RRC-inactive state. Therefore, the terminal, which is in the RRC-inactive state, may shifting to the RRC-connected state without being affected by the congestion processing of the core network for delivering signaling, thereby aggravating the congestion situation of the core network. The disclosure is intended to solve the above problem.

Solution to Problem

The disclosure provides a method for controlling a congested state by a base station, the method including: receiving a first message for resumption of a radio resource control (RRC) connection from a terminal, which is in an inactive state; if a network is in a congested state, determining a back-off parameter for backing off the terminal, which is in the inactive state; and including the determined back-off parameter in a second message for refusing to resume the RRC connection, and transmitting the second message to the terminal, which is in the inactive state.

The method for controlling a congested state by the base station may further include receiving a third message indicating a network-congested state from an access and mobility management function (AMF), and the third message includes information for determining the back-off parameter.

The third message includes information for releasing the RRC connection; and the method for controlling a congested state by the base station may further include, if the network is in a congested state, transmitting a fourth message for releasing the RRC connection based on the third message to the terminal, which is in the inactive state.

The third message includes a congested-state control procedure for the terminal, which is in the inactive state; and the method for controlling a congested state by the base station may further include: after reception of the first message, identifying whether the terminal having transmitted the first message is a terminal in the inactive state; and if the terminal having transmitted the first message is the terminal in the inactive state and the network is in the congested state, performing a congested-state control procedure of the terminal which has transmitted the first message based on the third message.

The back-off parameter includes information on a back-off timer, and the information on the back-off timer may be determined based on the congested state of the network.

The disclosure provides a method for controlling a congested state by a terminal, the method including: transmitting a first message for resumption of a radio resource control (RRC) connection to a base station; and if the network is in a congested state, receiving, from the base station, a second message for refusing to resume the RRC connection, wherein the second message includes a back-off parameter for backing off a terminal which is in an inactive state.

The method for controlling a congested state by the terminal may further include: driving a back-off timer based on the back-off parameter; and if the back-off timer expires, retransmitting the first message for resumption of the RRC connection to the base station.

The method for controlling a congested state by the terminal may further include: if an RRC connection request having a priority higher than a predetermined reference value occurs before the back-off timer expires, transmitting a third message for the RRC connection request to the base station.

The disclosure provides a base station including a transceiver, and a controller configured to: control the transceiver to receive a first message for resumption of a radio resource control (RRC) connection from a terminal which is in an inactive state; if a network is in a congested state, determine a back-off parameter for backing off the terminal which is in the inactive state; and control the transceiver to include the determined back-off parameter in a second message for refusing to resume the RRC connection and transmit the second message to the terminal which is in the inactive state.

The controller is configured to control the transceiver to receive a third message for indicating a network-congested state from an access and mobility management function (AMF), and the third message may include information for determining the back-off parameter.

The third message includes information for releasing the RRC connection, and the controller may be configured to, if the network is in a congested state, control the transceiver to transmit a fourth message for releasing the RRC connection based on the third message to the terminal which is in the inactive state.

The third message includes a congested-state control procedure for the terminal which is in the inactive state; and the controller may be configured to, after reception of the first message, identify whether the terminal which has transmitted the first message is a terminal in the inactive state, and if the terminal having transmitted the first message is the terminal in the inactive state and the network is in a congested state, perform a congested-state control procedure of the terminal which has transmitted the first message, based on the third message.

The disclosure provides a terminal including a transceiver, and a controller configured to: control the transceiver to transmit a first message for resumption of a radio resource control (RRC) connection to a base station; and if a network is in a congested state, control the transceiver to receive, from the base station, a second message for refusing to resume the RRC connection, wherein the second message may include a back-off parameter for backing off the terminal which is in an inactive state.

The controller is configured to: drive a back-off timer based on the back-off parameter; and if the back-off timer expires, control the transceiver to retransmit the first message for resumption of the RRC connection to the base station.

The controller may be configured to, if an RRC connection request having a priority higher than a predetermined reference value occurs before the back-off timer expires, control the transceiver to transmit a third message for the RRC connection request to the base station.

According to the disclosure, in order to reject the signaling connection of a terminal or control access by the terminal due to congestion occurrence, the 5G core network or MME (hereinafter referred to as CN) may provide, to a base station, a notification indicating that a process is to be performed in the case where the terminal is in the light connection mode or the RRC-inactive mode, thereby helping relieve congestion in the core network. The disclosure proposes two methods, that is, a method for resolving a congestion situation of a CN while maintaining a terminal in an RRC-inactive state, and a method for resolving the congestion situation of the CN by shifting the terminal into an RRC-idle state. Depending on the degree of congestion of the CN, one of two methods can be applied. The method according to the disclosure enables the terminal to be maintained in the RRC-inactive state instead of shifting to the RRC-idle state. Therefore, in the case where the terminal shifts to the RRC-connected state after a congestion situation is terminated, the terminal may shift from an inactive state to a connected state rather than shifting from the idle state to the connected state, and thus can maintain signaling savings due to the RRC inactive function.

DETAILED DESCRIPTION

In a description of embodiments of the disclosure, a description of technologies that are already known to those skilled in the art and are not directly relevant to the disclosure is omitted. Such omission of unnecessary descriptions is intended to prevent obscuring the main idea of the disclosure and to more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be made apparent by making reference to the embodiments described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented using computer program instructions. These computer program instructions can be provided to a processor of a general purpose computer, special purpose computer, or other programmable data processing apparatus, such that the instructions, executed via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer usable or the computer-readable memory produce an article of manufacture including instruction means that implements the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Additionally, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently, or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, "unit" does not always have a meaning limited to software or hardware. The "unit" may be constructed either to be stored in an addressable storage medium or to be executed on one or more processors. Therefore, the "unit" includes, for example, software elements, object-oriented software elements, class elements or task elements, processes, functions, properties, procedures, sub-routines, fragments of program code, drivers, firmware, micro-codes, circuits, data, databases, data structures, tables, arrays, and parameters. The elements and functions provided by the "unit" may be either combined into a smaller number of elements or "units" or divided into a larger number of elements or "units". Moreover, the elements and "units" may be implemented to be reproduced on one or more CPUs within a device or a security multimedia card. Also, in an embodiment, the "~ unit" may include one or more processors.

Entities appearing in the disclosure will be described as follows.

A terminal (UE) is connected to a radio access network (RAN) and is thus connected to a device configured to perform a mobility management function of a 5G core network device. In the disclosure, this will be referred to as an access and mobility management function (AMF). The AMF may refer to a function or a device that is in charge of both access to the RAN and mobility management of the terminal. The AMF serves to route session-related messages for the terminal to a session management function (SMF). The AMF is connected to the SMF, and the SMF establishes, by connecting with a user plane function (UPF) and allocating a user plane resource to be provided to the terminal, a tunnel for transmission of data between a base station and the UPF. In the disclosure, the term "AMF" may refer to a core network device configured to provide mobility management for a terminal, that is, a device having a different name but configured to receive NAS messages of a terminal. For convenience, the device in the disclosure will be referred to as an access mobility management function (AMF). The AMF corresponds to the MME of the 4G system. In the disclosure, the AMF may be replaced with a 4G MME. In addition, a registration procedure may be replaced with a 4G attach procedure or a tracking area update procedure. In addition, RRC-inactive may be replaced with 4G light connection.

Figure 1:
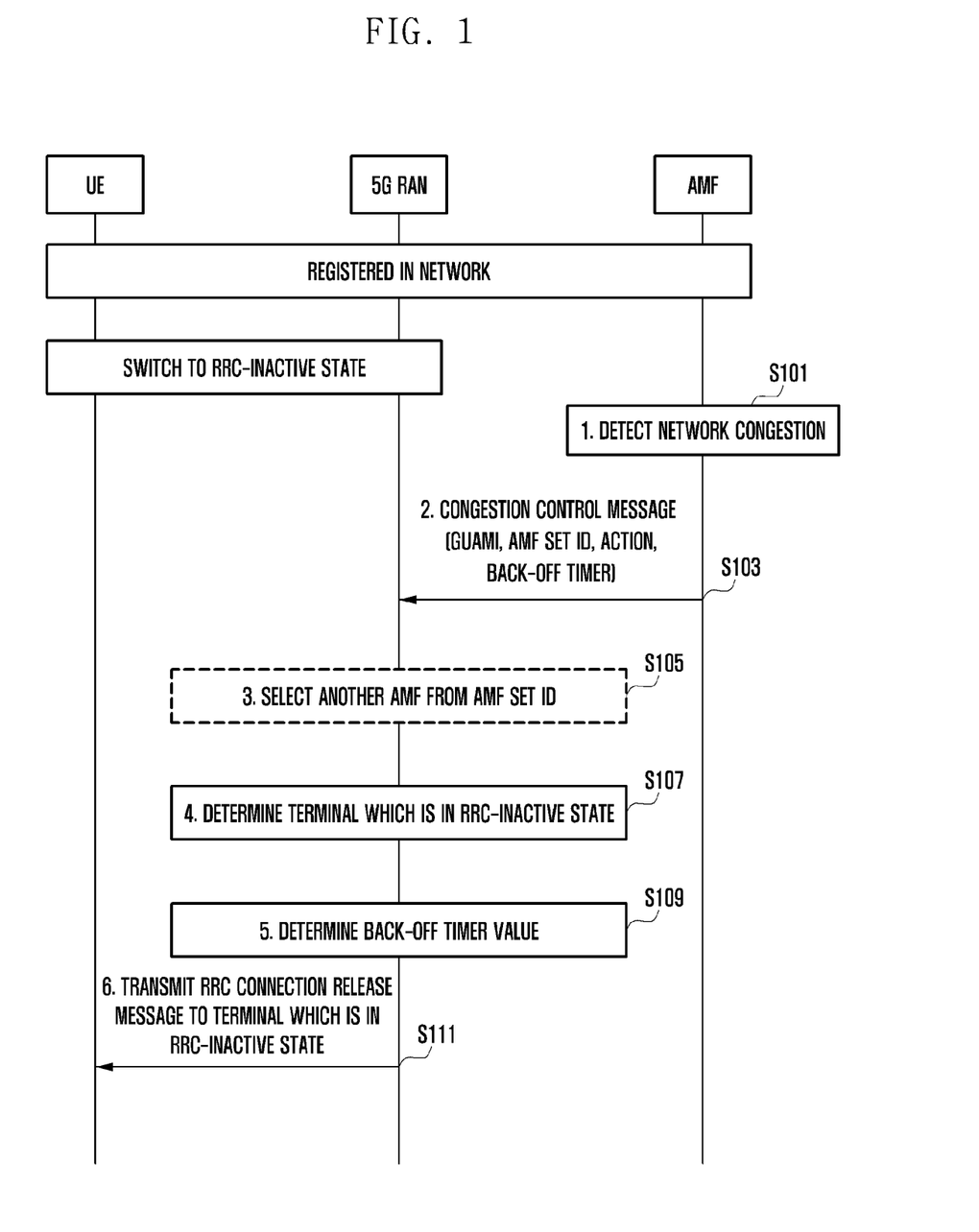
FIG. 1 illustrates a method for releasing an RRC connection and shifting to an RRC-idle state if a CN congestion situation occurs in the case where a terminal is in an RRC inactive or light connection mode.

First Embodiment—FIG. 1

A terminal performs a registration procedure with an AMF to access a mobile communication network. After the terminal accesses the mobile communication network, the terminal may enter an RRC-inactive state according to the determination of a base station. From the standpoint of a CN, the terminal is in a connected (CM-connected) state, but from the standpoint of RRC, the terminal is in an RRC-inactive state rather than an RRC-connected state. Unlike an RRC-idle state, RRC-inactive has a feature in which a connection between a base station for serving a terminal and a CN, that is, a connection between a base station and the AMF, and a connection between a base station and a UPF (4G gateway) are kept alive. Accordingly, if the terminal performs an RRC resume procedure in order to return to the RRC-connected state again, a data radio bearer that is being used by the terminal is activated again, and fast shifting to a connection state is possible using a connection between the base station and the CN, which is continuously active state. The embodiment is configured under the assumption that the terminal is in the RRC-inactive state through the above operation.

According to operation 1, the AMF may detect congestion of a network (indicated by reference numeral S101). The network congestion includes the following cases: where the AMF serves a very large number of terminals, where too much control signaling occurs from multiple terminals to the AMF, where failure occurs in the AMF and processing relating to a terminal is delayed, where a large number of terminals are gathered in a specific AMF set (=AMF group), and where excessive control signaling occurs in a specific AMF set. In the case of determining the congestion situations as described above, the AMF transmits an overload start message to a base station connected to the AMF through operation 2 (indicated by reference numeral S103). The overload start message is for providing notification of the congested state of the AMF to a base station, and may also specify operations to be performed by the base station for the congested AMF.

Operation 2 may include at least one of the following pieces of information according to an embodiment of the disclosure.

Globally unique AMF ID (GUAMI): GUAMI is an ID referring to one AMF, and includes PLMN information, an AMF set ID, and an AMF pointer. If information on the GUAMI is included, a base station may determine that only a particular AMF is congested. Although it is referred to as "GUAMI" in the disclosure, the GUAMI denotes an ID indicating one AMF.

AMF set ID: AMF set ID refers to an ID indicating a group of AMFs. If the AMF set ID is included, a base station may determine that the entire particular AMF group is congested.

Action: Action refers to a congestion control processing method which is provided to a base station according to the degree of congestion in the AMF. The congestion control processing method by the base station may differ according to whether a terminal that is connected to the base station is using an emergency session, is a high-priority session user, is a low-access-priority terminal, or is a delay tolerant access terminal, and according to whether an access class of the terminal is equal to or smaller than a predetermined value. In Addition, the AMF may indicate, in the action, an operation of rejecting shifting to the connected state of the terminal depending on a category for access control, i.e. according to whether the terminal performs access using a specific category, or whether the terminal has requested access using the specific category and the terminal is currently in a connected state. According to an embodiment of the disclosure, in the action, special processing relating to an RRC-inactive terminal may be specified, and the action may be applied according to the criteria listed above. Alternatively, regardless of whether the terminal is in an RRC-inactive state, action applicable to a terminal that is in a CM-connected state or a terminal that is in a CM-idle state may be specified. Since the CM-idle matches the RRC-idle, an identifier called "idle" transmitted by the CN may be recognized as an RRC-idle. An identifier called "CM-connected" needs to be determined as either RRC-connected or RRC-inactive, so, unless the AMF explicitly provides notification of the same, an operation of distinguishing between the two states and determining whether to apply congestion processing is dependent on the determination of the base station. The action may include operations relating to whether or not to reject resumption of an RRC connection, to release an RRC connection, or to release an RRC-inactive terminal according to the above criteria.

Back-off timer: A back-off timer is a time value used for providing notification of an expected congestion situation resolution time in AMF to a base station. For example, if it is determined that the congestion situation can be resolved in the case where shifting to the connected state of the terminal is blocked for at least 20 minutes by the AMF, the AMF may display 20 minutes in a back-off timer and notify the base station of the same. The base station having received the notification may reject shifting to the RRC-connected state of all terminals for 20 minutes.

In operation 3, in the case where a base station receives the GUAMI from operation 2, the base station may operate to select another AMF from the AMF set to which the corresponding AMF belongs (indicated by reference numeral S105). Since it is determined that the AMF referred to by the GUAMI is congested, if the base station is able to connect with another AMF in the same AMF set capable of sharing context for a terminal, the congestion situation can be avoided. Therefore, after reception of the GUAMI in operation 2, the base station selects another AMF from the same AMF set, and if a signaling request by the terminal is subsequently received, the base station may continue to provide service by routing a message to the newly selected AMF. Alternatively, the base station selects another AMF from the same AMF set and then transmits N2 (an interface between the base station and the AMF) signaling to the new AMF, thereby indicating that a new association has occurred between the base station and the AMF. Therefore, the new AMF enables management of all pieces of information for terminal management.

In the case where the base station receives the AMF set ID from operation 2, or fails to select another AMF in operation 3 (e.g., all other AMFs are in congested), in order to perform processing according to the AMF congestion situation for the RRC-inactive UEs, the base station may first determine the following operation as to whether or not to apply congestion control to RRC-inactive.

If the base station receives a special action for the RRC-inactive terminal in operation 2, the base station first determines a terminal currently in the RRC-inactive state according to the received special action (indicated by reference numeral S107), and determines an operation to be performed on the RRC-inactive terminal. This may be performed according to an operation performed in operation 2.

In operation 2, if a special action for the RRC-inactive terminal is not transmitted, or if only an action for a terminal which is in the idle/connected state is transmitted, the base station determines an operation to be performed for a terminal which is in the idle state or a terminal which is in the connected state. For the terminal in the idle state, as in the method defined in the 3GPP standard, it is possible to increase a barring rate for an access-barring method so that the base station may perform a barring process in the case where the terminal which is in the idle state requests a connection, or it is possible to identify whether the RRC establishment of the terminal is caused by an emergency state or a delay-tolerant state. Therefore, an operation of allowing a connection may be applied only to a terminal having a high access class, or an operation of allowing a connection may be applied only to a terminal having requested an RRC connection due to an emergency. In addition, the base station may determine an operation relating to the case where the terminal requests access using a specific category according to a category for access control, or an operation relating to the case where the terminal has requested access using the specific category and is currently in a connected state. According to a detailed embodiment of the disclosure, if the action for a terminal, which is in the connected state in operation 2, has been transmitted, the base station may regard a terminal in the RRC-inactive state as a terminal that is in the connected state because the terminal in the RRC-inactive state is also in the CM-connected state. Therefore, the base station may determine a method for applying CN congestion processing with respect to the connected terminal, that is, the RRC-connected terminal and the RRC-inactive terminal. The operation of the determined method is performed according to operation as follows.

If the action has been transmitted regardless of whether the terminal is in the idle/connected or RRC-inactive state in operation 2, the base station itself may determine mutually different operations to be applied to a CM-idle terminal, a CM-connected terminal, a terminal which is particularly in a CM-connected state but is in an RRC-inactive state, and a terminal which is in a CM-connected state but is also in an RRC-connected state. For terminals which are in CM-idle (=RRC-idle) and RRC-connected states, operations pre-defined in 3GPP will be followed. For an RRC-inactive terminal, operations according to an embodiment of the disclosure may be applied.

In operation 4, the base station, which has determined whether to apply the congestion processing of the AMF to the RRC-inactive terminal, may operate according to the following operation. First, the base station may identify whether an RRC-inactive terminal is using an emergency session, is a high-priority session user, is a low-access-priority terminal, or is a delay tolerant access terminal, or whether an access class of the terminal is equal to or smaller than a predetermined value. If the terminal is using an emergency session, the base station may exclude the terminal from a subject to which congestion processing of the AMF is applied. Alternatively, the base station may determine whether the RRC-inactive terminal is a high-priority session user by looking at QoS values (QCI, ARP) used by the corresponding terminal, and may then exclude the terminal using the high-priority session from a subject to which congestion processing of the AMF is applied. Alternatively, the base station may determine whether the RRC-inactive terminal is a low-access-priority terminal based on information transmitted in the case where the terminal establishes an RRC connection, and if the RRC-inactive terminal is the low-access-priority terminal, the base station may determine that the RRC-inactive terminal is to be subjected to congestion processing of the AMF. Alternatively, the base station may determine whether the RRC-inactive terminal is a delay tolerant access terminal, based on information transmitted in the case where the terminal establishes the RRC connection, and if the RRC-inactive terminal is the delay tolerant access terminal, the base station may determine that the RRC-inactive terminal is subjected to congestion processing of the AMF. Alternatively, the base station may acquire and include an access class value of a terminal in the case where the terminal establishes the RRC connection, and may use the access class value to determine that the terminal is to be subjected to congestion processing of the AMF. For example, the base station may determine that the congestion processing of the AMF is to be applied to terminals of a certain access class or lower. The criterion for determining a certain access class by the base station may be determined according to a congested state (the degree of congestion) of the AMF or information indicating application of congestion processing to the terminals of a specific access class or lower, the information being provided by the AMF via the action. Alternatively, if the terminal establishes the RRC connection according to an access control category, which has been notified of via SIB information by the base station, the base station stores, as the context of the terminal, the access control category used when the terminal establishes the RRC connection. In the case where the congestion control operation of the AMF is requested, the base station may determine to apply congestion control to a terminal that has performed access using a specific category. The determination may be specified in the action of operation 2 message transmitted by the AMF. As another example, since a terminal which is in the RRC-connected state includes data currently being transmitted/received, it may be determined that congestion control processing for the terminal configured to currently transmit/receive data is not performed, and since a terminal which is in the RRC-connected state has no data currently being transmitted/received, it is desirable to reduce the congestion of the AMF by applying control according to the congestion of the AMF.

According to the embodiment of FIG. 1, after determining whether to apply, to the RRC-inactive terminal, congestion control due to congestion of the AMF as described above, an operation of releasing the RRC-inactive terminal may be performed as a processing method according thereto. According to operation 5 proposed in the disclosure, in the case of releasing the RRC-inactive terminal, the base station may determine to provide a back-off timer that is in a standby state until the corresponding terminal requests the RRC connection again (indicated by reference numeral S109). S109 may be performed based on the back-off timer value received from the AMF in operation 2. Since the AMF itself gives the required back-off timer value in order to solve the congestion situation of the AMF, the base station may start the timer from the moment at which the timer is provided. If the base station determines to provide a back-off timer to the terminal while performing RRC release, the base station may transmit the remaining value of the timer, by which the base station operates, to the terminal according to operation 6. Alternatively, the base station may transmit, to the terminal, the value received from the AMF without change. Alternatively, based on the value received from the AMF, the base station may transmit a timer value which has been adjusted to a shorter or longer time. As another detailed example, even if the base station does not receive the back-off timer from the AMF in operation 2, the base station itself may determine the degree of back-off of the terminal based on the load condition and the like of the AMF. The base station includes information related to the determination in the RRC release message in operation 6 and transmits the same (indicated by reference numeral S111). Upon receipt of the message, the terminal receives the back-off timer and starts the timer, and does not request an RRC connection while the back-off timer is running. The message in operation 6 includes a cause for RRC release, and the cause indicates that the RRC release occurs due to the CN congestion.

The terminal may or may not have received the back-off timer through operation 6. If the terminal has received the back-off timer, the terminal may request the RRC connection again after the back-off timer has expired. Alternatively, the terminal may determine that the a new RRC connection request is made due to priority call processing related to, for example, an emergency or public safety, and then may perform the RRC connection request even if the back-off timer is running. At this time, the terminal may stop the back-off timer and not run the back-off timer until the base station provides the back-off timer value again. Alternatively, the terminal may continuously use the RRC connection without stopping the back-off timer. In this case, the terminal may continuously run the back-off timer during priority call processing related to, for example, an emergency or public safety. If the terminal completes priority call processing related to an emergency or public safety, and thus the terminal is to be in the RRC-idle state, then if the back-off timer has not expired, the terminal does not request another RRC connection (a connection other than a connection requiring priority processing such as a call related to an emergency or public safety) until the back-off timer expires. If the terminal has not received the back-off timer value, the terminal may attempt to transmit an RRC request message to the base station at any time that an RRC request is required. At this time, the RRC request may be rejected or granted depending on the access control method configured by the base station.

Figure 2:
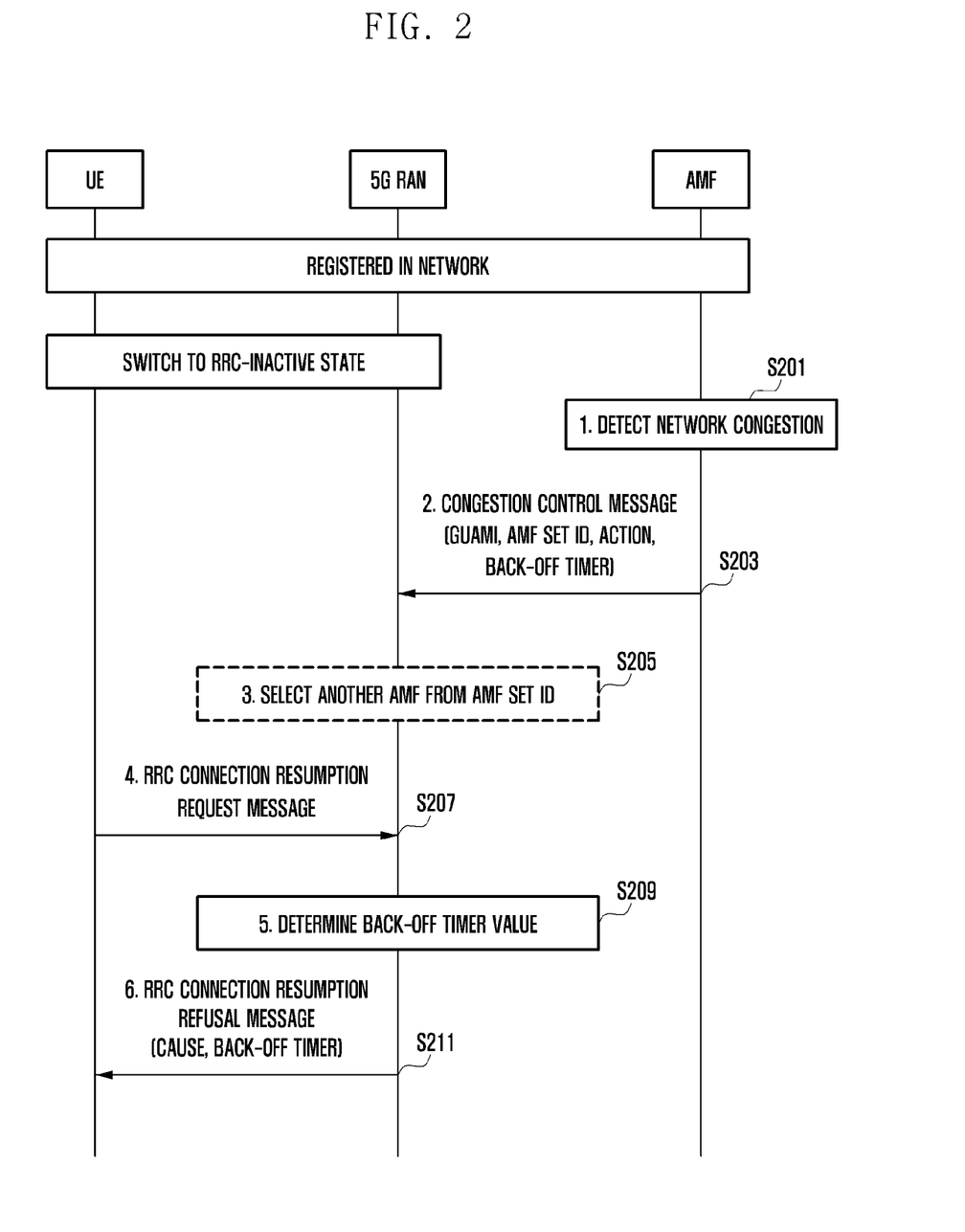
FIG. 2 illustrates a method for, if a CN congestion situation occurs in the case where a terminal is in an RRC inactive or light connection mode, rejecting an RRC resume request made by a terminal so as to maintain the terminal in an RRC-inactive state.

Second Embodiment (Operations 1 to 3 are the Same as in Embodiment 1)—FIG. 2

A terminal performs a registration procedure with an AMF to access a mobile communication network. After the terminal accesses the mobile communication network, the terminal may enter an RRC-inactive state according to the determination of a base station. From the standpoint of a CN, the terminal is in a connected (CM-connected) state, but from the standpoint of RRC, the terminal is in an RRC-inactive state rather than an RRC-connected state. Unlike the RRC-idle state, the RRC-inactive has a feature in which a connection between a base station for serving a terminal and a CN, that is, a connection between a base station and the AMF, and a connection between a base station and a UPF (4G gateway) are kept alive. Accordingly, if the terminal performs an RRC resume procedure in order to return to an RRC-connected state again, a data radio bearer that is being used by the terminal is activated again and fast shifting to a connection state is possible using the connection between the base station and the CN, which is in continuously active state. The embodiment is configured under the assumption that the terminal is in the RRC-inactive state through the above operation.

According to operation 1, the AMF may detect congestion of a network (indicated by reference numeral S201). The network congestion includes the following cases: where the AMF serves a very large number of terminals, where too much control signaling occurs from multiple terminals to the AMF, where failure occurs in the AMF and processing relating to a terminal is delayed, where a large number of terminals are gathered in a specific AMF set (=AMF group), or where excessive control signaling occurs in a specific AMF set. In the case of determining the congestion situations as described above, the AMF transmits an overload start message to a base station connected to the AMF through operation 2 (indicated by reference numeral S203). The overload start message is for providing notification of the congestion situation of the AMF to a base station, and may also specify operations to be performed by the base station for the congested AMF.

Operation 2 may include at least one of the following pieces of information according to an embodiment of the disclosure.

Globally unique AMF ID (GUAMI): GUAMI is an ID referring to one AMF, and includes PLMN information, an AMF set ID, and an AMF pointer. If information on the GUAMI is included, a base station may determine that only a particular AMF is congested. Although it is referred to as "GUAMI" in the disclosure, the GUAMI denotes an ID indicating one AMF.

AMF set ID: AMF set ID refers to an ID indicating a group of AMFs. If the AMF set ID is included, the base station may determine that the entire particular AMF group is congested.

Action: Action refers to a congestion control processing method for notifying a base station of the degree of congestion in the AMF. The congestion control processing method may vary depending on the following criteria. For example, the congestion control processing method may differ according to whether a terminal is using an emergency session, is a high-priority session user, is a low-access-priority terminal, or is a delay tolerant access terminal, or according to whether the access class of the terminal is equal to or smaller than a predetermined value. In addition, the congestion control method may differ according to whether the terminal performs access using a specific category depending on a category for access control, or whether the terminal has requested access using the specific category and whether the terminal is currently in a connected state. Together with the above criteria, an operation of rejecting shifting to the connected state of the terminal according to the above criteria may be indicated in the action. According to an embodiment of the disclosure, in the action, special processing relating to an RRC-inactive terminal may be specified, and the action may be applied according to the criteria listed above. Alternatively, regardless of whether the terminal is in RRC-inactive, an action applicable to a terminal that is in a CM-connected state or a terminal that is in a CM-idle state may be specified. Since CM-idle matches RRC-idle, an identifier called idle transmitted by the CN may be recognized as an RRC-idle. An identifier called "CM-connected" needs to be determined as either RRC-connected or RRC-inactive, so, unless the AMF explicitly provides notification of the same, the operation of distinguishing two states and determining whether to apply congestion processing is dependent on the determination of the base station. The action may include operations relating to whether or not to reject resumption of an RRC connection, to release an RRC connection, or to release an RRC-inactive terminal according to the above criteria.

Back-off timer: A back-off timer is a time value used for providing notification of an expected congestion situation resolution time in AMF to a base station. For example, if it is determined that the congestion situation can be resolved in the case where shifting to the connected state of the terminal is blocked for at least 20 minutes by the AMF, the AMF may display 20 minutes in a back-off timer and provides notification of the same to the base station. The base station having received the notification may reject shifting to the RRC-connected state of all terminals for 20 minutes.

In operation 3, in the case where a base station receives the GUAMI from operation 2, the base station may operate to select another AMF from the AMF set to which the corresponding AMF belongs (indicated by reference numeral S205). Since it is determined that the AMF referred to by the GUAMI is congested, if the base station is capable of connecting with another AMF from the same AMF set capable of sharing context for a terminal, the congestion situation can be avoided. Therefore, after reception of the GUAMI in operation 2, the base station selects another AMF from the same AMF set, and if a signaling request by the terminal is received later, the base station may continue a service by routing a message to the newly selected AMF. Alternatively, the base station selects another AMF from the same AMF set, and then transmits N2 (an interface between the base station and the AMF) signaling to the new AMF, to thereby indicating that a new association has occurred between the base station and the AMF. Therefore, the new AMF enables management of all pieces of information for terminal management.

In the case where the base station receives the AMF set ID from operation 2, or fails to select another AMF in operation 3 (e.g., all other AMFs are in congested), in order to perform processing according to the AMF congestion situation for the RRC-inactive UEs, the base station may first determine the following operation as to whether or not to apply congestion control to the RRC-inactive UEs.

If the base station receives a special action for the RRC-inactive terminal in operation 2, the base station first determines a terminal currently in the RRC-inactive state according to the received special action. In addition, the base station determines an operation to be performed for the RRC-inactive terminal. The operation may be performed according to an operation performed in operation 2.

In operation 2, if a special action for the RRC-inactive terminal is not transmitted, or if only an action for a terminal which is in the idle/connected state is transmitted, the base station determines an operation to be performed for a terminal which is in the idle state or a terminal which is in the connected state. For the terminal in the idle state, as in the method defined in the 3GPP standard, it is possible to increase a barring rate for an access-barring method so that the terminal can perform a barring process in the case where the terminal which is in the idle state requests a connection, or it is possible to identify whether the RRC establishment of the terminal is caused by an emergency state or a delay-tolerant state. Therefore, an operation of allowing a connection may be applied only to a terminal having a high access class, or a connection may be allowed only for a terminal having requested an RRC connection due to an emergency. In addition, the base station may determine an operation relating to the case where the terminal requests access using a specific category according to a category for access control, or an operation relating to the case where the terminal has requested access using a specific category and is currently in a connected state. According to a detailed embodiment of the disclosure, if an action for a terminal that is in the connected state in operation 2 has been transmitted, the base station may regard a terminal that is in the RRC-inactive state as the terminal which is in the connected state because the terminal in the RRC-inactive state is also in the CM-connected state. Therefore, the base station may determine a method for applying CN congestion processing with respect to the connected terminal, that is, the RRC-connected terminal and the RRC-inactive terminal. The determined method is performed according to operation as follows.

If the action has been transmitted regardless of whether the terminal is in the idle/connected or RRC-inactive state in operation 2, the base station itself may determine mutually different operations to be applied to a CM-idle terminal, a CM-connected terminal, a terminal which is particularly in a CM-connected state but is in an RRC-inactive state, and a terminal which is in a CM-connected but RRC-connected state. For terminals which are in CM-idle (=RRC-idle) and RRC-connected states, operations pre-defined in 3GPP are followed. For an RRC-inactive terminal, operations according to an embodiment of the disclosure may be applied.

The base station, which has determined whether to apply the congestion processing of the AMF to the RRC-inactive terminal, may operate according to the following operation. First, the base station may identify whether an RRC-inactive terminal is using an emergency session, whether the terminal is a high-priority session user, a low-access-priority terminal, or a delay tolerant access terminal, or whether the access class of the terminal is equal to or smaller than a predetermined value. If the terminal is using an emergency session, the base station may exclude the terminal from a subject to which congestion processing of the AMF is applied. Alternatively, the base station may determine whether the RRC-inactive terminal is a high-priority session user by looking at QoS values (QCI, ARP) used by the corresponding terminal, and may then exclude the terminal using the high-priority session from a subject to which congestion processing of the AMF is applied. Alternatively, the base station may determine whether the RRC-inactive terminal is a low-access-priority terminal, based on information transmitted in the case where the terminal establishes an RRC connection, and if the RRC-inactive terminal is a low-access-priority terminal, the base station may determine that the RRC-inactive terminal is to be subjected to congestion processing of the AMF. Alternatively, the base station may determine whether the RRC-inactive terminal is a delay tolerant access terminal, based on information transmitted in the case where the terminal establishes the RRC connection, and if the RRC-inactive terminal is the delay tolerant access terminal, the base station may determine that the RRC-inactive terminal is to be subjected to congestion processing of the AMF.

Alternatively, the base station may acquire and include an access class value of the terminal in the case where the terminal establishes an RRC connection, and may use the access class value to determine that the terminal is to be subjected to congestion processing of the AMF. Here, the base station may determine that the congestion processing of the AMF is to be applied to terminals of a certain access class or lower. The criterion for determining the certain access class by the base station may be determined according to the congested state (the degree of congestion) of the AMF or information indicating application of congestion processing to terminals of a specific access class or lower, the information being provided by the AMF via the action. Alternatively, if the terminal establishes the RRC connection according to an access control category, which has been notified of via SIB information by the base station, the base station stores, as the context of the terminal, the access control category used when the terminal establishes the RRC connection. In the case where the congestion control operation of the AMF is requested, the base station may determine to apply congestion control to a terminal that has performed access using a specific category. The determination may be specified in the action of the operation 2 message transmitted by the AMF. As another example, since a terminal which is in the RRC-connected state includes data currently being transmitted/received, it may be determined that congestion control processing for the terminal configured to currently transmit/receive data is not being performed, and since a terminal which is in the RRC-inactive state has no data currently being transmitted/received, it is desirable to reduce the congestion of the AMF by applying control according to the congestion of the AMF.

According to the embodiment of FIG. 2, as described above, the base station determines whether to apply congestion control due to congestion of the AMF to the RRC-inactive terminal, and as a processing method according thereto, the base station may apply the congestion control in the case where a terminal in an RRC-inactive state transmits an RRC resume request (indicated by reference numeral S207). That is, the base station may determine to apply the congestion control to the terminal, which has been transmitted the RRC connection resumption request, among RRC-inactive terminals to which it has been determined to apply the congestion control according to the above procedure. Since, in the case where the terminal is in the RRC-inactive state, the base station is not aware how long the terminal is in the RRC-inactive state, the determination is made such that the congestion control process of the AMF is performed by rejecting only the case where terminals, which are in the RRC-inactive state, make a request for resumption of the connection again, rather than transmitting a release or back-off to the respective terminals which are in the RRC-inactive state. According to operation 4, the terminal may indicate, in the message of operation 4, the cause for resumption of the RRC connection. For example, the message may indicate priority call processing related to, for example, an emergency or public safety. Upon receiving the message, the base station may determine that congestion control processing is not to be applied to the corresponding terminal. Alternatively, the terminal may transmit, in the message of operation 4, category information used in access control with respect to a request, made by the terminal itself, to reestablish a connection. The base station may look at the category information and determine whether the connection needs to be supported even if the corresponding category is congested or determine whether the connection does not need to be supported if the corresponding category is in a congested situation. The base station, which has determined not to apply congestion control to the terminal having transmitted the resume request, grants the RRC resumption request and establishes an RRC connection of the terminal.

The base station, which has determined to apply congestion control processing to the RRC-inactive terminal having been requested the RRC connection resumption through the determination procedure described above, may determine to provide a back-off timer, which is in a standby state until the corresponding terminal requests the RRC connection resumption (indicated by reference numeral S209). S209 may be performed based on the back-off timer value received from the AMF in operation 2. Since the AMF provides a required back-off timer value in order to solve the congestion situation of the AMF by itself, the base station may start the timer from the moment that the timer is provided. If the base station determines to provide a back-off timer value to the terminal while performing RRC release, the base station may configure the remaining value of the timer, by which the base station operates, as the back-off timer value which will be provided to the terminal, and transmit the same to the terminal according to operation 6. Alternatively, the base station may transmit, to the terminal, the value received from the AMF without change. Alternatively, based on the value received from the AMF, the base station may transmit a timer value that has been adjusted to a shorter or longer time. As another detailed example, even if the base station does not receive the back-off timer from the AMF in operation 2, the base station itself may determine the degree of back-off of the terminal based on the load condition of the AMF. The base station includes information relating to the determination in the RRC resume reject message of operation 6 and transmits the message (indicated by reference numeral S211). The terminal, which has received the message, receives a back-off timer value and starts a timer for the value, and does not request RRC connection resumption while the back-off timer is running. The message in operation 6 includes a cause for RRC release, and the cause indicates that the RRC release occurs due to the CN congestion.

The terminal may or may not have received the back-off timer through operation 6. If the terminal has received the back-off timer, the terminal may request the RRC connection resumption again after the back-off timer expires. Alternatively, the terminal may determine that the new RRC connection request is made due to priority call processing related to, for example, an emergency or public safety, and then may perform the RRC connection resumption request even if the back-off timer is running. At this time, the terminal may stop the back-off timer and not run the back-off timer until the base station provides the back-off timer again. Alternatively, the terminal may continuously use the resumed RRC connection without stopping the back-off timer. In this case, the terminal may continuously run the back-off timer during priority call processing related to, for example, an emergency or public safety. If the terminal completes priority call processing related to, for example, an emergency or public safety, and thus the terminal is to be in the RRC-idle state, then, if the back-off timer has not expired, the terminal does not request another RRC resume until the back-off timer expires. If the terminal has not received the back-off timer, the terminal may attempt to transmit an RRC resumption request message to the base station at any time at which an RRC resumption request is required. At this time, the RRC resume request may be rejected or granted according to the access control method configured by the base station.

As another detailed example, the base station may shift the state of a terminal, which has requested RRC connection resumption, to RRC-idle through operation 6. The message in operation 6 includes an identifier indicating shifting to RRC-idle, and, if the message in operation 6 is an RRC release message, or if the message in operation 6 specifies CN congestion as the cause, the terminal may understand the message as an operation of "RRC release". The operation may occur according to the action provided by the AMF in operation 2. Since the base station may not provide the RRC connection to the terminal due to congestion of the AMF, even if the terminal has been in the RRC-inactive state and requested resumption of the connection, the base station may determine to release the RRC connection rather than returning the state of the terminal to the RRC-inactive state again. In this case, since an N2 interface connection between the base station and the AMF with respect to the terminal is also released, the AMF may release an active N2 connection with the base station for the corresponding terminal in a congested situation and context thereof. The release may help alleviate the AMF congestion. The back-off timer value is included in the message of operation 6 according to the above detailed example, and thus the terminal can be backed off for a specific period of time.

Figure 3:
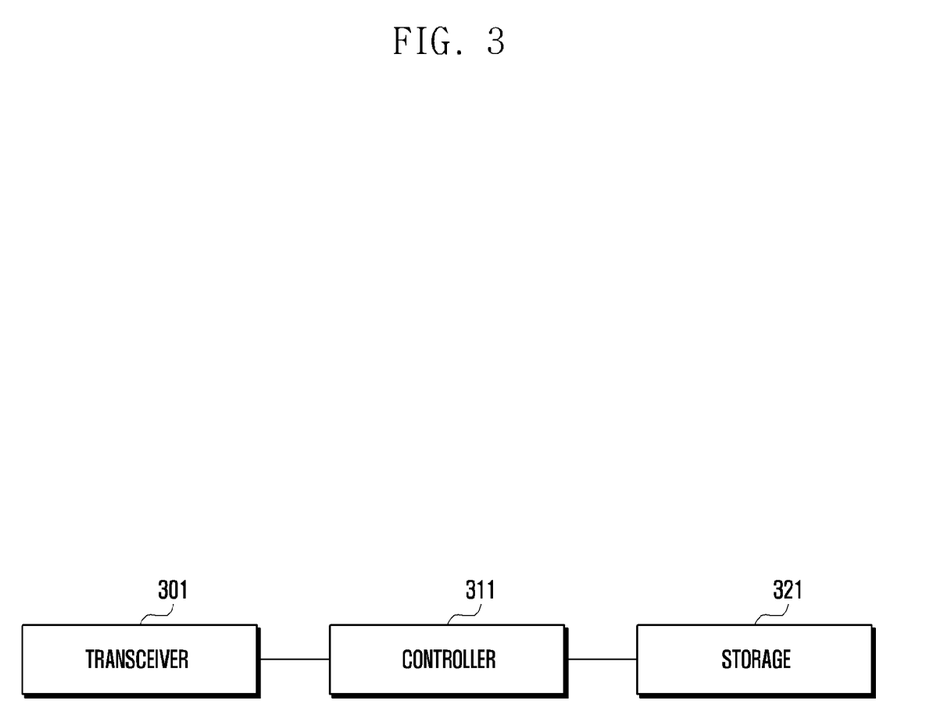
FIG. 3 illustrates a block diagram of a base station according to an embodiment of the disclosure.

FIG. 3 is a block diagram of a base station according to an embodiment of the disclosure.

According to an embodiment, the base station may include a transceiver 301, a controller 311, and a storage 321. In the disclosure, the controller 311 may be defined as a circuit, an application-specific-integrated circuit, or at least one processor.

The transceiver 301 may transmit or receive signals with another network entity. For example, the transceiver 301 may transmit system information to a terminal, and may transmit a synchronization signal or a reference signal.

The controller 311 may control the overall operation of the base station according to the embodiment proposed by the disclosure. For example, the controller 311 may control signal flow between respective blocks in order to perform operations according to the flowchart described above.

According to an embodiment, the controller 311 may: control the transceiver 301 to receive a first message for resumption of radio resource control (RRC) connection from a terminal, which is in an inactive state; if a network is in a congested state, determine a back-off parameter for backing off the terminal which is in the inactive state; and control the transceiver 301 to include the determined back-off parameter in a second message for refusing to resume the RRC connection and transmit the second message to the terminal which is in the inactive state.

The storage 321 may store at least one of information transmitted or received to or from the transceiver 301 and information generated through the controller 311.

Figure 4:
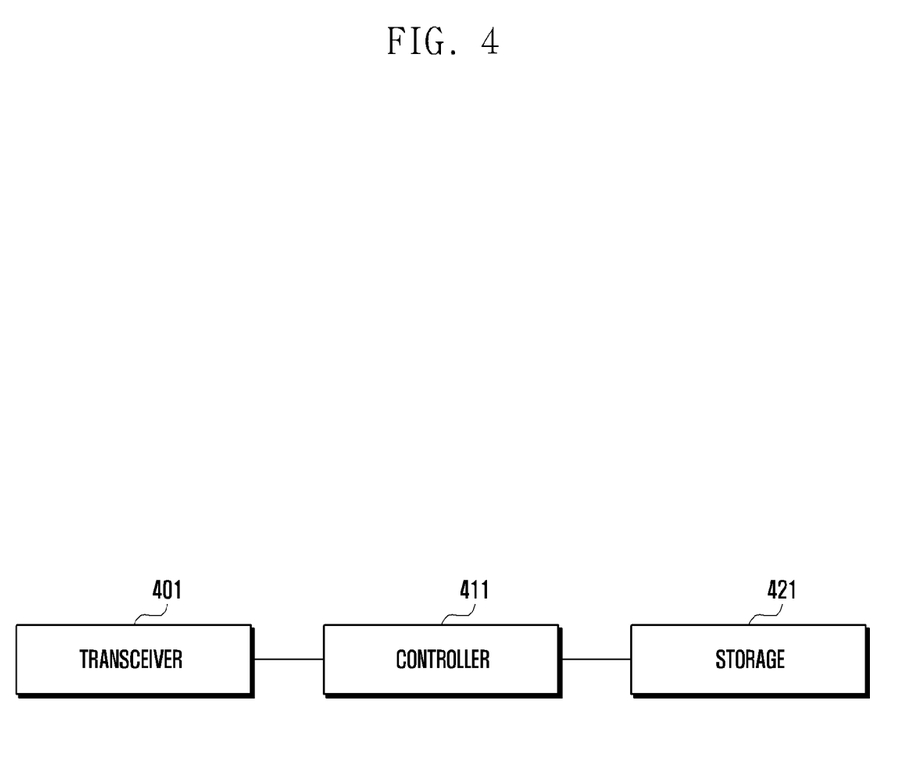
FIG. 4 illustrates a block diagram of a terminal according to an embodiment of the disclosure.

FIG. 4 is a block diagram of a terminal according to an embodiment of the disclosure.

According to an embodiment, the terminal may include a transceiver 401, a controller 411, and a storage 421. In the disclosure, the controller 411 may be defined as a circuit, an application-specific-integrated circuit, or at least one processor.

The transceiver 401 may transmit or receive signals with another network entity. For example, the transceiver 401 may receive system information from a base station, and may receive a synchronization signal or a reference signal.

The controller 411 may control the overall operation of the terminal according to the embodiment proposed by the disclosure. For example, the controller 411 may control signal flow between respective blocks in order to perform operations according to the flowchart described above.

According to an embodiment, the controller 411 may control the transceiver 401 to transmit a first message for resumption of a radio resource control (RRC) connection to a base station, and in the case where a network is in a congestion state, may control the transceiver 401 to receive, from the base station, a second message for refusing to resume the RRC connection.

The storage 421 may store at least one of information transmitted or received to or from the transceiver 401 and information generated through the controller 411.

Meanwhile, the embodiments of the disclosure disclosed in the specification and the drawings have been presented to easily explain the technical content of the disclosure and help comprehension of the disclosure, and do not limit the scope of the disclosure. That is, it will be obvious to those skilled in the art to which the disclosure belongs that different modifications can be achieved based on the technical spirit of the disclosure. Further, if necessary, the above respective embodiments may be employed in combination. For example, parts of methods proposed in the disclosure may be combined to operate the base station and the terminal. In addition, although the above embodiments are presented based on an LTE/LTE-A system, other modifications based on the technical idea of the above embodiments may be implemented in other systems, such as 5G and NR systems.

The invention claimed is:

1. A method performed by a base station in a wireless communication system, the method comprising:
    receiving, from an access and mobility management function (AMF) connected with the base station, an overload start message to inform an overload state of the AMF, the overload start message including information on an action for the overload state, and the information indicating which traffic is to be rejected, wherein the traffic includes a first traffic requested by at least one terminal and a second traffic for a specific session;
    receiving, from a terminal in a radio resource control (RRC) inactive state, an RRC resume request message for an RRC connection establishment; and
    transmitting, to the terminal, a response message for the RRC resume request message based on the information on the action for the overload state.

2. The method of claim 1, wherein the information is set to reject the first traffic, based on the RRC connection establishment for non-emergency.

3. The method of claim 2, wherein the response message includes a value of a timer that limits signaling connection requests of the terminal until the timer expires.

4. The method of claim 2, wherein the response message includes an RRC reject message and an RRC release message.

5. A method performed by a terminal in a wireless communication system, the method comprising:
    transmitting, to a base station, a radio resource control (RRC) resume request message for an RRC connection establishment, in an RRC inactive state; and
    receiving, from the base station, a response message for the RRC resume request message,
    wherein the response message is based on information on an action for an overload state of an access and mobility management function (AMF), the information indicating which traffic is to be rejected, wherein the traffic includes a first traffic requested by at least one terminal and a second traffic for a specific session, and wherein the information is included in an overload start message to inform the overload state of the AMF transmitted from the AMF to the base station.

6. The method of claim 5, wherein the information is set to reject the first traffic, based on the RRC connection establishment for non-emergency.

7. The method of claim 6, wherein the response message includes a value of a timer that limits signaling connection requests of the terminal until the timer expires.

8. The method of claim 6, wherein the response message includes an RRC reject message and an RRC release message.

9. A base station of a wireless communication system, comprising:
a transceiver; and
a controller configured to:
control the transceiver to receive, from an access and mobility management function (AMF) connected with the base station, an overload start message to inform an overload state of the AMF, the overload start message including information on an action for the overload state, and the information indicating which traffic is to be rejected, wherein the traffic includes a first traffic requested by at least one terminal and a second traffic for a specific session;
control the transceiver to receive, from a terminal in a radio resource control (RRC) inactive state, an RRC resume request message for an RRC connection establishment; and
control the transceiver to transmit, to the terminal, a response message for the RRC resume request message based on the information on the action for the overload state.

10. The base station of claim 9, wherein the information is set to reject the first traffic, based on the RRC connection establishment for non-emergency.

11. The base station of claim 10, wherein the response message includes a value of a timer that limits signaling connection requests of the terminal until the timer expires.

12. The base station of claim 10, wherein the response message includes an RRC reject message and an RRC release message.

13. A terminal of a wireless communication system, comprising:
a transceiver; and
a controller configured to:
control the transceiver to transmit a radio resource control (RRC) resume request message for an RRC connection establishment, in an RRC inactive state; and control the transceiver to receive, from a base station, a response message for the RRC resume request message, wherein the response message is based on information on an action for an overload state of an access and mobility management function (AMF), the information indicating which traffic is to be rejected, wherein the traffic includes a first traffic requested by at least one terminal and a second traffic for a specific session, and wherein the information is included in an overload start message to inform the overload state of the AMF transmitted from the AMF to the base station.

14. The terminal of claim 13, wherein the information is set to reject the first traffic, based on the RRC connection establishment for non-emergency.

15. The terminal of claim 14, wherein the response message includes a value of a timer that limits signaling connection requests of the terminal until the timer expires.

16. The terminal of claim 14, wherein the response message includes an RRC reject message and an RRC release message.

17. The method of claim 1,
wherein the specific session includes an emergency session or a high priority session, and
wherein the response message is a message to permit the RRC connection establishment, based on the RRC connection establishment for the emergency session or the high priority session.

18. The method of claim 5,
wherein the specific session includes an emergency session or a high priority session, and
wherein the response message is a message to permit the RRC connection establishment, based on the RRC connection establishment for the emergency session or the high priority session.

19. The base station of claim 9,
wherein the specific session includes an emergency session or a high priority session, and
wherein the response message is a message to permit the RRC connection establishment, based on the RRC connection establishment for the emergency session or the high priority session.

20. The terminal of claim 13,
wherein the specific session includes an emergency session or a high priority session, and
wherein the response message is a message to permit the RRC connection establishment, based on the RRC connection establishment for the emergency session or the high priority session.

* * * * *